(12) United States Patent
James

(10) Patent No.: US 10,086,417 B2
(45) Date of Patent: Oct. 2, 2018

(54) COMBINED REMEDIATION BIOMASS AND BIO-PRODUCT PRODUCTION PROCESS

(71) Applicant: Agri-Tech Producers, LLC, Columbia, SC (US)

(72) Inventor: Joseph J. James, Charleston, SC (US)

(73) Assignee: Agri-Tech Producers, LLC, Columbia, SC (US)

( * ) Notice: Subject to any disclaimer, the term of this patent is extended or adjusted under 35 U.S.C. 154(b) by 0 days.

(21) Appl. No.: 15/308,908

(22) PCT Filed: May 5, 2015

(86) PCT No.: PCT/US2015/029182
§ 371 (c)(1),
(2) Date: Nov. 4, 2016

(87) PCT Pub. No.: WO2015/171570
PCT Pub. Date: Nov. 12, 2015

(65) Prior Publication Data
US 2017/0072442 A1 Mar. 16, 2017

Related U.S. Application Data

(60) Provisional application No. 61/988,632, filed on May 5, 2014.

(51) Int. Cl.
*B09C 1/00* (2006.01)
*B09C 1/10* (2006.01)
(Continued)

(52) U.S. Cl.
CPC ............. *B09C 1/00* (2013.01); *A01B 79/00* (2013.01); *B09C 1/105* (2013.01); *C05D 9/00* (2013.01);
(Continued)

(58) Field of Classification Search
CPC ........ B09C 1/00; B09C 1/105; B09C 2101/00
See application file for complete search history.

(56) References Cited

U.S. PATENT DOCUMENTS 327,256 A 9/1885 Haas
1,386,331 A 8/1921 Heckman
(Continued)

FOREIGN PATENT DOCUMENTS

DE 4447133 A1 7/1995
DE 4415766 A1 11/1995
(Continued)

OTHER PUBLICATIONS

Science, Ethanol Can Contribute to Energy and Environmental Goals, 2006, vol. 311 No. 5760, pp. 506-507.

*Primary Examiner* — Frederick L Lagman
(74) *Attorney, Agent, or Firm* — Jeffrey T. Stover; Haynsworth Sinkler Boyd, P.A.

(57) ABSTRACT

A method, for mitigating an environmental condition, may include assessing a geographic area with which the environmental condition is associated; and creating a plan to mitigate the environmental condition. The plan may identify a bio-crop for mitigating the environmental condition and a bio-product to be produced from the bio-crop. The method may also include planting the bio-crop in soil that is located within the geographical area. The bio-crop may be planted in a manner that enables the environmental condition to be mitigated. The method may further include harvesting the bio-crop based on planting the bio-crop; processing the harvested bio-crop to obtain biomass; producing the bio-product based on the biomass; and outputting the bio-product based on producing the bio-product.

16 Claims, 8 Drawing Sheets

(51) Int. Cl.
*C10L 5/44* (2006.01)
*C05F 11/02* (2006.01)
*C10L 9/08* (2006.01)
*A01B 79/00* (2006.01)
*C05D 9/00* (2006.01)
*C10L 1/02* (2006.01)
*A01B 79/02* (2006.01)

(52) U.S. Cl.
CPC .............. *C05F 11/02* (2013.01); *C10L 1/026* (2013.01); *C10L 5/44* (2013.01); *C10L 5/445* (2013.01); *C10L 5/447* (2013.01); *C10L 9/083* (2013.01); *A01B 79/02* (2013.01); *B09C 2101/00* (2013.01); *C10L 2200/0469* (2013.01); *C10L 2200/0476* (2013.01); *C10L 2290/02* (2013.01); *C10L 2290/06* (2013.01); *C10L 2290/08* (2013.01); *C10L 2290/28* (2013.01); *C10L 2290/543* (2013.01); *Y02E 50/10* (2013.01); *Y02E 50/15* (2013.01); *Y02E 50/30* (2013.01); *Y02E 50/343* (2013.01); *Y02W 30/47* (2015.05)

(56) References Cited

U.S. PATENT DOCUMENTS

| | | | |
|---|---|---|---|
| 3,110,583 A | 11/1963 | Richardson | |
| 3,577,678 A | 5/1971 | Burton | |
| 3,770,623 A | 11/1973 | Seidel | |
| 4,678,582 A | 7/1987 | Lavigne | |
| 4,839,051 A | 6/1989 | Higa | |
| 4,872,985 A | 10/1989 | Dinges | |
| 5,011,604 A | 4/1991 | Wilde et al. | |
| 5,720,130 A | 2/1998 | Bost | |
| 5,766,474 A * | 6/1998 | Smith | C02F 3/327 210/170.05 |
| 5,829,191 A | 11/1998 | Gatliff | |
| RE35,989 E * | 12/1998 | Hubbs, Jr. | C09K 17/32 47/58.1 R |
| 5,927,005 A | 7/1999 | Gardea-Torresdey et al. | |
| 5,944,872 A | 8/1999 | Chaney et al. | |
| 5,947,041 A | 9/1999 | Licht | |
| 5,993,649 A * | 11/1999 | DeBusk | C02F 3/32 210/103 |
| 6,250,237 B1 * | 6/2001 | Licht | B09C 1/002 111/200 |
| 6,302,942 B1 | 10/2001 | Ma et al. | |
| 6,413,426 B1 * | 7/2002 | DeBusk | C02F 3/32 210/242.1 |
| 6,692,641 B2 * | 2/2004 | DeBusk | C02F 3/32 210/602 |
| 7,074,330 B1 * | 7/2006 | DeBusk | C02F 3/327 210/170.01 |
| 7,556,735 B1 * | 7/2009 | DeBusk | B09C 1/00 210/602 |
| 7,718,063 B2 | 5/2010 | Jacquet | |
| 8,956,539 B2 | 2/2015 | Smith et al. | |
| 2004/0101945 A1 | 5/2004 | Bogan et al. | |
| 2004/0261578 A1 * | 12/2004 | Harman | B09C 1/10 75/710 |
| 2005/0126990 A1 * | 6/2005 | Lynch | B09C 1/105 210/602 |
| 2009/0255176 A1 * | 10/2009 | Giovannetti | C12P 39/00 47/58.1 SC |
| 2010/0112649 A1 | 5/2010 | Wilson et al. | |
| 2010/0199734 A1 * | 8/2010 | Bottcher | C05D 9/00 71/8 |
| 2010/0278595 A1 | 11/2010 | Codd et al. | |
| 2011/0023565 A1 | 2/2011 | Yanik et al. | |
| 2011/0067995 A1 | 3/2011 | Lusk | |
| 2011/0182670 A1 * | 7/2011 | Rossato | B09C 1/105 405/128.75 |
| 2011/0203253 A1 * | 8/2011 | Derr | C10L 1/04 60/204 |
| 2011/0283601 A1 | 11/2011 | Gallop et al. | |
| 2012/0057936 A1 * | 3/2012 | Cook | C05F 9/04 405/128.7 |
| 2013/0104450 A1 | 5/2013 | Dodson et al. | |
| 2013/0105387 A1 | 5/2013 | Antoinette et al. | |
| 2013/0192321 A1 | 8/2013 | Cheiky | |
| 2013/0333067 A1 | 12/2013 | Lee et al. | |
| 2014/0069003 A1 | 3/2014 | Calderon et al. | |

FOREIGN PATENT DOCUMENTS

| | | |
|---|---|---|
| DE | 4437255 A1 | 4/1996 |
| DE | 19851141 A1 | 6/1999 |
| DE | 19853279 A1 | 5/2000 |
| JP | 2011072941 A | 4/2011 |

* cited by examiner

COMBINED REMEDIATION BIOMASS AND BIO-PRODUCT PRODUCTION PROCESS

BACKGROUND

There are a number of man-made and natural environmental conditions that exist in the United States and throughout the world including industrial waste, contaminated surface and ground water, loss of fertile top soil, wind and water erosion, deforestation, agricultural run-off, etc. By way of example, industrial waste may be generated by coal coal-burning power plants or other industrial facilities that produce a number of combustion and non-combustion residuals and byproducts such as coal ash that typically contains carbon, silicon oxide ($SiO2$) and calcium oxide (CaO), as well as various other elements and compounds that may be hazardous to the environment or to people and animals. Other pollutants include nutrients in agricultural soils and from livestock residue, such as manure, bacteria, fertilizers, pesticides, etc. that make their way into ground and surface water. Still other pollutants include heavy metals, chemicals, metal alloys, and rare earth elements that are suspended or dissolved in industrial wastewater and solid waste including without limitation copper, nickel, arsenic, beryllium, boron, cadmium, chlorine compounds, chromium, hexavalent chromium, cobalt, lead, manganese, mercury, molybdenum, selenium, strontium, thallium, sulfur, vanadium, zinc, along with dioxins and polycyclic aromatic hydrocarbon (PAH) compounds (collectively, "pollutants").

Furthermore, many of today's under-developed countries do not have access to a viable source of power such as electricity, gas, etc. and are left to fend for themselves for sources heat for warmth, fuel to cook their food or sterilize water, etc. For example, many people and communities, particularly in under-developed countries, resort to cutting forests to burn firewood for fuel and warmth that is causing air pollution and pervasive respiratory illness. Furthermore, the practice of using firewood as the principle source of energy has resulted in substantial deforestation that is causing the rapid loss of fertile top soil due to water and wind erosion. Such loss of topsoil makes growing crops and feeding growing populations difficult. On a larger scale, such populations do not have sufficient remediation measures to address such environmental conditions and/or prevent their reoccurrence. Furthermore, such populations do not have access to and/or cannot produce sufficient amounts of biomass and/or bio-products that are lower in cost than conventional environmental remediation measures (e.g., such as excavation, etc.) and/or non-renewable energy sources and/ or fossil fuels (e.g., coal, firewood, petroleum etc.). Thus, there is a need for a combined process that enables lower cost remediation of environmental conditions, the planting and harvesting of these lower-cost bio-crops, and the processing and production of lower-cost biomass and bio-products that can be used to remediation environmental conditions; provide a renewable, clean, and continuous source of energy; and/or enable economic growth through the distribution and sale of such bio-products on the open market. As it stands currently, such lower cost bio-products may not be available to remediate the environmental conditions, generate power for heat, sanitation or cooking, and/or to sell on the free market. The lack of sufficient remediation and the shortage of sufficient amounts of lower cost bio-crops, biomass and bio-products combine to create a systemic problem and an ever-increasing likelihood of a human health disaster in the near future that could result in the large loss of life in under-developed countries as well as higher costs or other challenges for the world's developed countries.

SUMMARY

According to an implementation, described herein, a method for mitigating an environmental condition may include assessing a geographic area with which the environmental condition is associated; and creating, based on the assessment, a plan to mitigate the environmental condition. The plan may identify a bio-crop for mitigating the environmental condition and a bio-product to be produced from the bio-crop. The method may also include planting, based on creating the plan, the bio-crop in soil that is located within the geographical area. The bio-crop may be planted in a manner that enables the bio-crop to mitigate the environmental condition. The method may further include harvesting the bio-crop based on planting the bio-crop; processing the harvested bio-crop to obtain biomass; processing the biomass to create the bio-product; and outputting the bio-product based on processing the biomass.

According to another implementation, described herein, a method for mitigating environmental conditions and for producing a bio-product may include assessing a geographic area associated with a first condition of the environmental conditions and a second condition of the environmental conditions. The first condition may correspond to contamination and the second condition may correspond to a lack of a clean energy source. The method may also include creating, based on the assessment, a plan to mitigate the first condition and the second condition. The plan may identify a bio-crop to be used to mitigate the first environmental condition and the bio-product for mitigating the first condition or the second condition. The method may further include planting the bio-crop in soil associated with the contamination; and cultivating the planted bio-crop to enable a pollutant, within the soil, to be removed or extracted by roots of the bio-crop. Removing the pollutant may enable the first environmental condition to be mitigated. The method may yet further include harvesting the bio-crop based on cultivating the bio-crop; processing the harvested bio-crop to remove the pollutant from the harvested bio-crop and to obtain biomass; processing the biomass in a manner that produces the bio-product that corresponds to bio-coal; and outputting the bio-product to mitigate the second environmental condition.

According to a further implementation, described herein, a method for mitigating one or more environmental conditions and for producing one or more bio-products may include assessing a geographic area associated with the one or more environmental conditions; and creating, based on the assessment, a plan to mitigate the one or more environmental conditions. The plan identifying a bio-crop to be used to mitigate the one or more environmental conditions and the one or more bio-products to be produced from the bio-crop. The method may also include planting a group of plants, associated with the bio-crop, in soil that is located within the geographical area. The group of the plants being planted in a manner that enables the bio-crop to mitigate at least one condition of the one or more environmental conditions. The method may further include harvesting the bio-crop based on planting the bio-crop; processing the harvested bio-crop to obtain biomass; processing the biomass to produce one or more bio-products; and applying at least one bio-product, of the one or more bio-products, to the soil to: mitigate further the at least one condition, or mitigate a second condition, of the one or more environmental conditions.

DETAILED DESCRIPTION

Figure 1A:
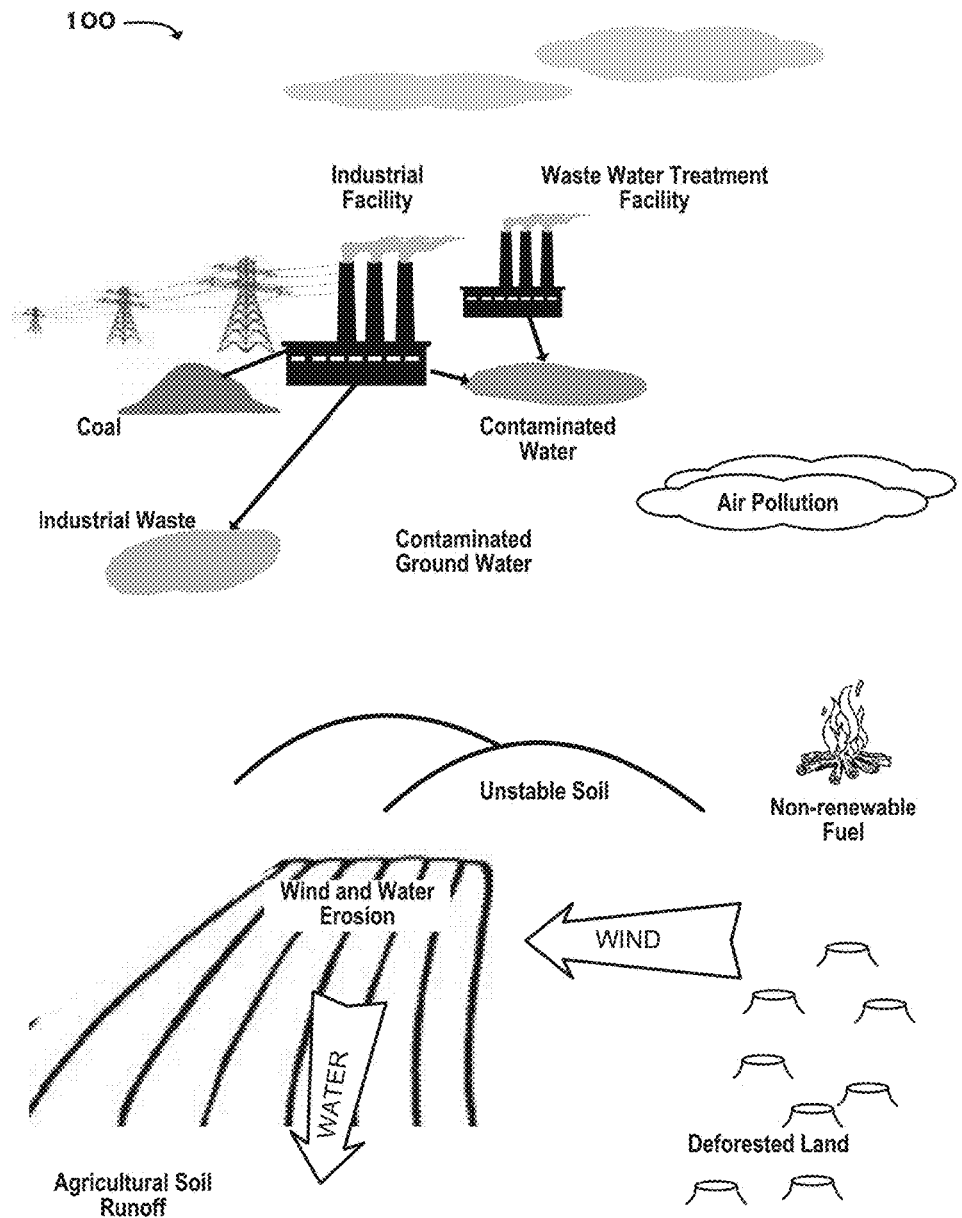
FIGS. 1A and 1B are diagrams of example environments in which the systems and/or methods described herein may be implemented.

The systems and/or methods may enable a combination of remediation, biomass and bio-product production (CRBBP) process, described herein, to be performed to treat conditions that pose a risk to human health and welfare such as the loss of viable agricultural land (e.g., due to erosion caused by wind, water, deforestation, over-grazing, etc.); loss of livestock due to malnourishment and starvation (e.g., due to the loss of grazing land, agricultural land, feedstock, etc.); exposure (e.g., due to deforestation, loss of shelter, loss of wind abatement, etc.); lack of clean and renewable energy for cooking, heating, etc.; disease (e.g., respiratory and other ailments to air pollution and other conditions); etc.

The systems and/or methods may also, or alternatively, permit a CRBBP process to be performed that enables bio-crops to be planted and/or cultivated to remedy a variety environmental harms, such as industrial waste discharge, ground water contamination, agricultural runoff, destabilized soil, exposure to wind, deforestation, etc. The systems and/or method may also, or alternatively, permit a CRBBP process to be performed that enables biomass to be harvested from the bio-crops and processed to produce a variety of bio-products such as biochar, bio-fuel, bio-coal, bio-cooking fuel, combustible fuels and chemicals, bio-fertilizer, feedstock, livestock bedding, etc. Such bio-products can, in turn, be offered on the market and sold and/or used to further mitigate such threats to human health and welfare and/or to remedy such environmental harms.

Bio-crops and biomass are described herein based on the species sorghum for explanatory purposes, but such bio-crops and biomass need to be so limited. Additionally, or alternatively, any variety of known bio-crops may be used such as sorghum, miscanthus, maize, sunflower, switch grass, hemp, soy, trees, bushes, algae, seaweed, kelp, etc.). Biomass includes any material obtained from the bio-crops. The term bio-product, as used herein, includes biochar, bio-coal, bio-fertilizer, bio-cooking fuel, combustible fuel and chemicals, bio-feedstock, animal bedding, or any other product or by product that is produced as a result of processing biomass.

The systems and/or methods, described herein, may also, or alternatively, include assessing the nature and degree of an environmental condition and/or the risk posed to human health and welfare based on such an environmental condition. Such an assessment may include assessing environmental harm within a geographical area (e.g., including a water supply, agricultural land, an industrial facility, a coal ash pond, a village, a city, sloped land, deforested lands, etc.).

The systems and/or methods may also, or alternatively, include creating a CRBBP process plan, based on the assessment, that identifies one or more remediation activities to be performed, biomass to be harvested and processed, and one or more bio-products to be produced. The CRBBP process plan may, for example, consider one or more bio-crops to be planted to remediate an environmental condition, a desired quantity and/or type of biomass to be harvested from the bio-crops and processed, and one or more bio-products to be produced, from the biomass, to produce a first bio-product that can be used for further remediation or a second type of bio-product that can be distribution to farms, industrial facilities and/or retails in the market. The plan may balance the need for environment remediation, with the cost and risk of growing bio-crops, producing sufficient quantities or types of biomass, and processing the biomass for the produce the desired type and quantity of bio-products.

Additionally, or alternatively, the systems and/or methods may, based on the assessment and/or the CRBBP process plan, include performing one or more CRBBP operations and/or activities to identify an appropriate a bio-crop species (e.g., sorghum, miscanthus, maize, sunflower, soy, switch grass, hemp, tree, bush, algae, seaweed, kelp, etc.) to be planted that remedies a certain environmental harm such as, for example, to stabilize soil, treat contaminated water (e.g., waste water greywater, surface water, etc.), mitigate soil erosion due to water, and/or provide wind abatement to protect agriculture soil, people, and/or property, etc. The systems and/or methods may also, or alternatively, include performing a CRBBP operation to enable such bio-crops to be planted and/or cultivated to extract contaminants from industrial waste beds (e.g., such as coal ash from coal-burning power plants, mining operations, paper production, etc.), mining soils and effluent, contaminants from ground water, and/or nutrients from agricultural soil (e.g., to prevent runoff into the water supply). The systems and/or methods may also, or alternatively, include performing a CRBBP operation to harvest and/or treat bio-crops (e.g., through phytoremediation, bio-fractionation etc.) to recover such contaminants and/or nutrients from the harvested biomass (e.g., through chemical leaching, etc.) and/or to process the treated biomass (e.g., through a torrefaction, bio-fractionation, etc. process) to produce one or more bio-products such as, for example, biochar, bio-coal, bio-fuel, combustible fuels and chemicals, bio-fertilizer, feedstock and/or some other bio-product.

Figure 1B:
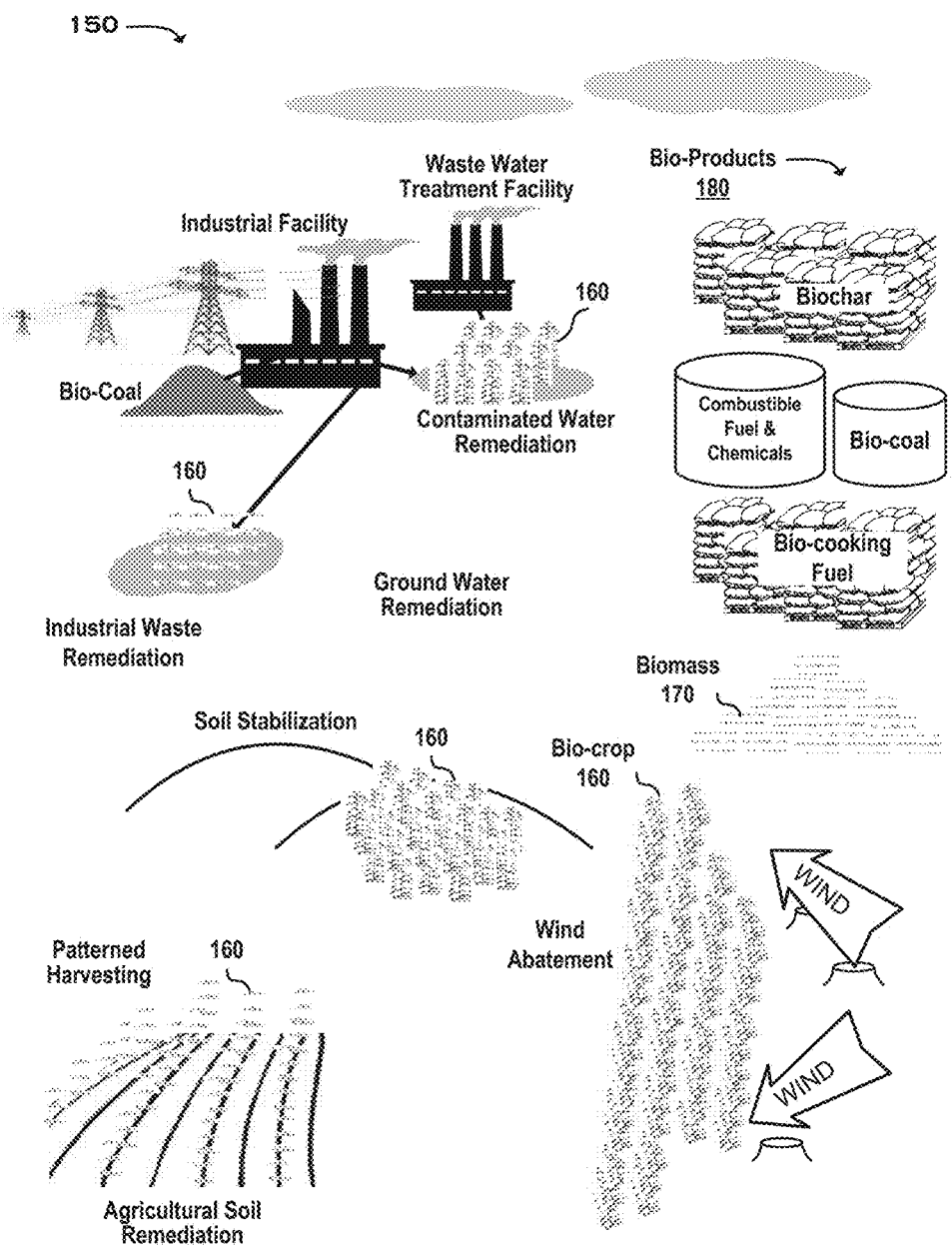

FIGS. 1A and 1B are diagrams of an example environment 100 in which the systems and/or methods described herein may be implemented. As illustrated in FIG. 1A, environment 100 may identify one or more conditions that pose significant risk to human health and welfare, and/or harm to the environment. By way of a non-limiting example, such conditions may include air pollution caused by burning wood (e.g., from deforested lands, etc.), fossil fuels such as coal or oil, etc.; industrial waste from industrial facilities such as manufacturing plants, chemical plants, mining operations, drilling operations, coal-burning power plants, waste water treatment plants, paper or pulp plants, etc. (e.g., coal ash, fly ash, contaminated waste water, mining effluent, paper pulp, solvents, etc.); contaminated water due to discharged waste water from industrial facilities, greywater from waste water treatment plants, etc.; deforested land (e.g., due to clear cutting for fuel, industrial development, etc.); unstable and/or eroding soil (e.g., due to deforestation, unabated wind due to deforestation, water erosion, etc.); agricultural runoff (e.g., soil nutrients polluting ground water and nearby surface waters); etc. (hereinafter, referred to collectively as "environmental conditions"). Such environmental conditions can be found throughout the world on agricultural lands with nearby water supplies, industrialized countries, under-developed countries, etc. People living in under-developed countries and/or in developed countries at or near areas where such environmental conditions are present are particularly at risk.

As illustrated in FIG. 1B, environment 150 may identify one or more uses of bio-crops to remedy or mitigate one or more of the risks identified with respect to environment 100 of FIG. 1A. For example, environment 150 may identify a bio-crop 160 that is planted to abate wind that may otherwise cause soil erosion, loss of fertile topsoil, or exposure of a dwelling or its inhabitants. Bio-crop 160 may include any suitable plant species (e.g., sorghum, miscanthus, maize, sunflower, soy, switch grass, hemp, a tree species, a bush species, algae, seaweed, kelp, etc.) to perform all or a portion of a CRBBP operation as described herein. Some or all of a CRBBP operation may be performed using one or more different types of bio-crop 160 in soil and/or water. In this non-limiting example, bio-crop 160 may be selected based on parameters such as type of medium to remediated. For example, for soil the CRBBP operation may use any type of plant or bio-crop 160 that can be planted in soil; for water the CRBBP operation may use any type of plant or bio-crop 160 that has roots that can be planted in soil to remove pollutants from water and/or a water-borne bio-crop 160 (e.g., algae, seaweed, kelp, etc.). Other parameters may also, or alternatively, include plant height, planting pattern (e.g., rows, directions, etc.) and/or planting density (e.g., quantity of plants per area), type of biomass to be harvested, type of bio-products to be produced, cost (e.g., based on the cost of the plants, planting, cultivating, harvesting, processing, etc.), ability to deflect and/or reduce prevailing winds to protect farmlands, dwellings, topsoil, etc. Environment 150 may also, or alternatively, identify bio-crop 160 that is planted to stabilize soil that is on an incline (e.g., that poses a threat to a population at lower elevations), is exposed due to deforestation, etc. Environment 150 may also, or alternatively, include bio-crop 160 that is planted to extract pollutants from contaminated ground water, waste water, greywater (e.g., partially treated waste water), industrial waste (e.g., coal ash, fly ash, etc.), brown fields on which waste water or greywater (e.g., from municipal water treatment plant) is sprayed, etc. Environment 150 may also, or alternatively, include bio-crop 160 that is planted to treat agricultural soil to remove nutrients, brown fields (e.g., on which contaminated water and/or industrial waste is sprayed or disposed), to remove pollutants, etc. Bio-crop 160 may be selectively harvested to enable the integrity of the soil to remain intact (e.g., to minimize erosion, etc.), to enable continued wind abatement, and/or to permit crop rotation with other crops.

Bio-crop 160 may also, or alternatively, be harvested and processed to create biomass 170. Biomass 170 may, for example, be processed using phytoremediation (described in greater detail below with respect to FIG. 2) to remove certain pollutants from the biomass 170. The removed pollutants can be processed to recover certain metals, rare earths, etc. for use in other industries. Biomass 170 may, as described in greater detail below in FIGS. 2, 5A and 5B, be further processed using torrefaction, bio-fractioning, pyrolysis, smelting, and/or other known processes to remove pollutants and/or create a bio-product 180 via carbon sequestration (e.g., or negative carbon dioxide emissions). Bio-product 180 may, by way of a non-limiting example, include biochar, bio-coal, bio-fertilizer, feedstock, bio-cooking fuel, combustible fuels and chemicals (e.g., bioethanol, biodiesel, bio-methanol, bio-butanol, bio-ethers, etc.), etc. Biochar may, for example, be used for feedstock and/or resemble charcoal and can be used for soil amendment, pH control, etc. to improve soil fertility and promote plant growth.

Additionally, or alternatively, additional remediation steps may be performed on bio-crops 160, including cultivation to support plant growth and/or remove and extract pollutants from ground water (e.g., via the roots of bio-crops 160), industrial waste, agricultural lands, etc. The removed and/or extracted pollutants may flow from the roots and become concentrated in the above-ground tissue of the bio-crops 160. Bio-crops 160 may be harvested, based on a particular plan, schedule, pattern, etc. (e.g., such as that set forth in the CRBBP process plan) and treated (e.g., using phytoremediation and/or some other processes) to remove the pollutants from biomass 170 for further processing. Such harvesting may be performed in a manner that, for example, maintains soil integrity (e.g., by leaving the roots in place, etc.), preserves wind abatement (e.g., by harvesting alternating rows, partial rows, etc.), continues removal of pollutants, etc.

Thus, pollutants from industrial waste (e.g., from coal-burning power plants, mining operations, paper production, etc.) can be treated with bio-crops 160 (e.g., using phytoremediation, etc.), in a manner that removes all or a portion of the pollutants from the industrial waste materials in-situ without having to relocate the industrial waste (though such relocation is not precluded) to other temporary or permanent storage locations (e.g., waste ponds, reservoirs, lagoons, tanks, containers, etc.).

Biomass 170 may be processed (e.g., in a manner set forth in the CRBBP process plan) to produce bio-products 180 that can be used to further reduce the risks to human health and welfare, as well as to the environment. For example, biochar may "fed back" into the CRBBP process to be used as a soil amendment to improve soil that has been depleted of nutrients due to erosion, poor farming techniques, etc. Biochar can also, or alternatively, be used in feed supplement for livestock, as a key component of water filters, for building insulation, etc. Bio-coal can be used as a low-cost and clean-burning renewable alternative to coal and/or mixed with coal to create a hybrid coal/bio-coal product that is cleaner relative to coal. Further, bio-coal may provide a source of heat and power that negates the need for certain populations to cut down forests to survive.

Thus, the CRBBP process may be used to create systemic solutions to mitigate certain environmental harms and threats to human health and welfare. A single bio-crop 160 may be used to mitigate such environmental harms and threats to human health and welfare while yielding biomass 170 that can be processed to produce one or more different types of bio-products 180. Bio-products 180 can be systematically incorporated back into environment 150 to further and continuously mitigate such environmental harms and threats to human health and welfare. Such bio-products 180 can also, or alternatively, be produced as a low cost, alternate form of renewable and clean energy and/or fuel to be sold on the market and/or to augment non-renewable forms of energy and/or fuels.

Figure 2:
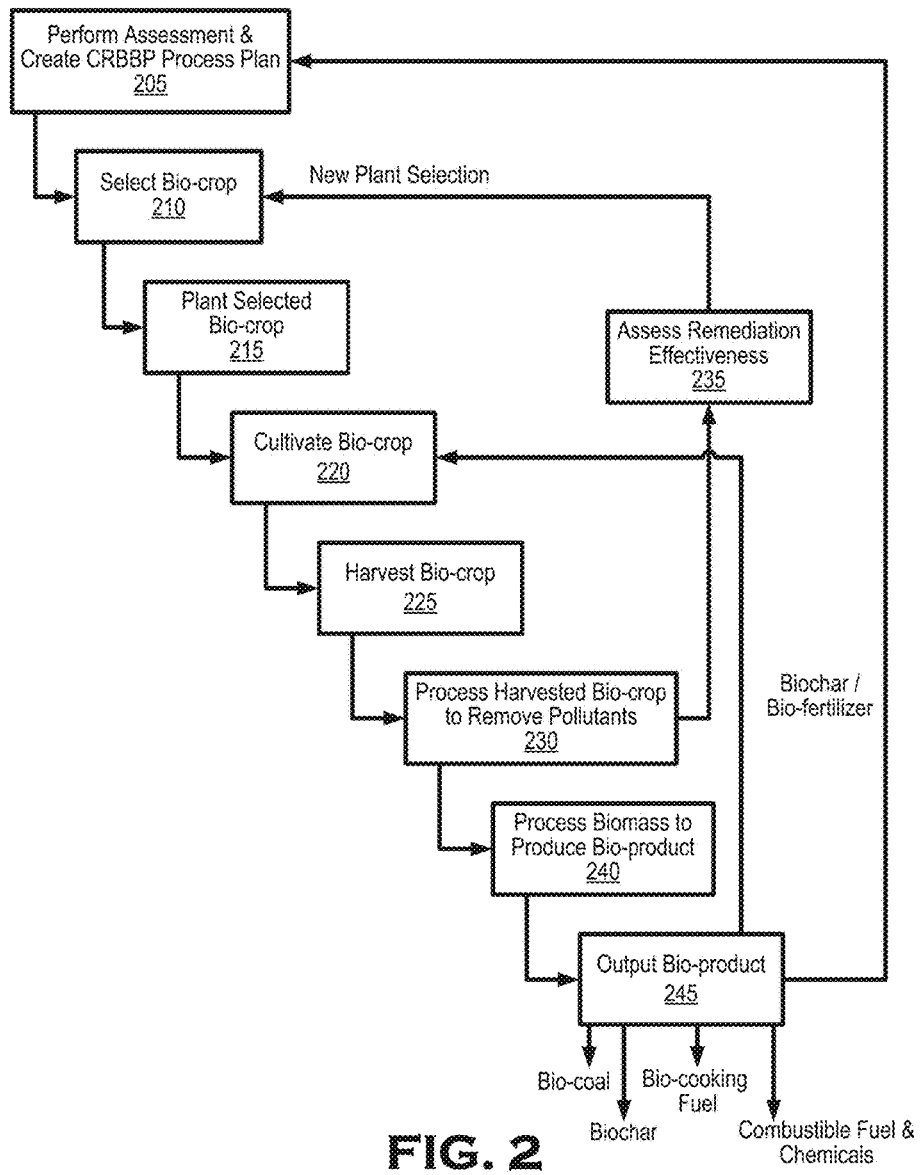
FIG. 2 is a flow chart of an example process to perform a combined remediation biomass and bio-product production operation.

FIG. 2 is a flow chart of an example process 200 that may enable a combined remediation biomass and bio-product production operation to be performed. As shown in FIG. 2, process 200 may include performing an assessment and creating a CRBBP process plan (BLOCK 205) and selecting a bio-crop (BLOCK 210). For example, an operator may assess a geographical area in which an environmental condition exists that poses risk to human health and welfare and/or to the environment. Such conditions may include, for example, diseases caused by air pollution due to the reliance on wood burning for cooking or heating fuel; loss of agricultural output due loss of top soil or infertile soil, exposure due to wind or lack of heating fuel, contaminated ground water, deforestation, industrial waste, etc.

Based on the conditions identified by the assessment, the operator may create a CRBBP process plan that, when executed, mitigates one or more of the conditions using a combination of bio-crop 160, biomass 170 and bio-product 180. The CRBBP process plan may identify one or more remediation activities to be performed using bio-crop 160, a type of quantity of biomass 170 to be harvested, and/or one or more bio-products 180 to be produced. The CRBBP process plan may, in a non-limiting example, identify one or more bio-crops 160 to be planted to remediate an environmental condition, desired quantity and/or type of biomass 170 to be harvested from bio-crops 160 and processed, and/or one or more bio-products 180 to be produced, from biomass 170, to produce a first bio-product 180 that can be used for further remediation of the environmental condition or a second bio-product 180 that can be distributed to farms, industrial facilities and/or retailers in the market. The CRBBP process plan may also, or alternatively, balance the need for environment remediation, with the cost and/or risk of growing and/or cultivating bio-crops 160, producing sufficient quantities or types of biomass 170, and/or processing biomass 170 to produce the desired type and quantity of bio-products 180.

By way of a non-limiting example, an operator may identify a first location at which a first bio-crop 160 is to be planted to act as a shield to deflect or abate wind that is causing soil erosion and/or exposure to people or dwellings. The operator may also, or alternatively, identify a second location at which a second bio-crop 160 is to be planted in an area to stabilize soil that is being lost due to wind and/or water erosion. In another non-limiting example, the operator may identify a third location at which a third bio-crop 160 is to be planted to reduce nutrient levels in agricultural soil and/or reduce runoff of nutrients that flow into ground water or surface waters. In yet another non-limiting example, the operator may identify a fourth location at which a fourth bio-crop 160 is to be planted to treat industrial waste and/or contaminated soil caused by such industrial waste. In this example, the CRBBP process plan may identify the first location—the fourth location and/or first bio-crop 160—fourth bio-crop 160.

Additionally, or alternatively, the operator may analyze one or more locations to determine characteristics of the conditions associated with the locations. For example, if a location corresponds to a coal ash pond, the operator may determine the amount of coal ash within the pond (e.g., based on dimensions, depth, volume, etc.), the type and/or concentration of pollutants within the coal ash, etc. to establish based characteristics (hereafter "baseline characteristics") to be remediated. The baseline characteristics may also, or alternatively, identify the proximity of the coal ash pond to one or more nearby water supplies or watersheds that could be effected by the pond; physical characteristics of the coal ash (e.g., density, water content, viscosity, flowability, granularity, texture, non-pollutants therein, etc.); particular pollutants and/or concentrations thereof that are included within the coal ash pond; particular plant growth-sustaining nutrients that are included in the coal ash; etc. Similarly, the operator may also, or alternatively, determine the baseline characteristics for other conditions such as agricultural lands (e.g., based on nutrient type, concentration, location of nearby water supply, etc.); wind abatement (e.g., direction of prevailing winds, wind speeds, effects of wind on soil, people, dwellings, etc.), deforestation (e.g., acreage, rate of deforestation, uses of timber, pollution levels, etc.), etc.

The systems and/or methods may include determining a CRBBP process plan for the conditions based on the baseline characteristics and other factors, such as a geographic location and/or region in which of the condition exists, the climate and/or growing season associated with the location or region, etc. The plan may also, or alternatively, identify a type of bio-crop 160 to be planted (e.g., sorghum, miscanthus, sunflower, soy, switch grass, hemp, trees, bushes, algae, seaweed, kelp, etc.), whether the crop should be annual or perennial or a combination thereof, one or more locations at which bio-crop 160 is to be planted, a method of planting bio-crop 160 (e.g., rows width, plant density, plant quantity, row orientation, planting depth, suspended planting, non-suspended planting, etc.), planting schedules, etc. The CRBBP plan may identify such type of bio-crop 160, type of planting, type of harvesting, etc. based on minimizing cost associated with growing a quantity or type of biomass 170 harvested, and/or to enable a certain type and/or quantity of bio-product 180 to be produced.

The CRBBP process plan may, for example, set forth a harvesting schedule, a method of harvesting (e.g., full or partial harvesting, alternating rows, rotational harvesting, etc.), a cultivation plan that may identify a type and/or quantity of fertilizer and/or bio-product or other additives (if any) to be used to treat the planting medium (e.g., soil, industrial waste, coal ash, agricultural soil, unstable soil, water, waste water, etc.) prior to planting or during cultivation of bio-crop 160, watering schedules for bio-crop 160, etc.

The CRBBP process plan may also, or alternatively identify a method of processing biomass 170, harvested from bio-crops 160, such as, for example, how plants are to be cut, chopped, shredded, etc., a desired amount of moisture content, a type of solvent and/or compound to be used to leach or otherwise extract pollutants from the harvested biomass 170, information associated with a torrefaction process, a bio-fractionation process, a pyrolysis process, etc. used to convert the leached biomass 170 to one or more bio-products 180. The CRBBP process plan may also, or alternatively, identify one or more types and/or quantities of bio-product 180 that are to be produced from the harvested and processed biomass 170, a schedule regarding when the different types of bio-products 180 are to be produced, and a manner in which certain bio-products 180 (e.g., biochar, bio-fertilizer, etc.) are to be recycled back into the CRBBP process as soil amendment for the planting medium (e.g., soil in which bio-crop 160 is planted). In the case of contaminated industrial waste (e.g., coal ash beds, contaminated water, etc.), the CRBBP process may continue for a time period needed to reduce a concentration level of pollutant to a level that is less than a threshold (e.g., less than a threshold set by a government regulation, below a toxicity level, at which ground water contamination can no longer occur, etc.).

Based on the CRBBP plan, the operator may identify a particular type of plant on which bio-crop 160 is to be based on the assessment (e.g., sorghum, miscanthus, maize, sunflower, soy, switch grass, hemp, trees, bushes, algae, seaweed, kelp, etc.). Bio-crop 160 may include annual plants, perennial plants, or some combination thereof, such as, by way of a non-limiting example, arundo donex (also known as "giant reed" or "arundo") (perennial), Miscanthus (perennial), Sorghum (annual or perennial), switch grass (perennial), hemp (perennial), soy, maize, and/or some other type of plant. Annual plants may be planted and harvested annually, while perennial varieties may be harvested annually, but may not be replanted annually. Furthermore, the perennial variety may include root systems that penetrate more deeply into the coal ash (e.g., 4, 5, 6, etc. feet) than the annual varieties (e.g., 2, 3, 4, etc. feet). Bio-crop 160 may include a single type of plant, or a combination of different types of plants that are planted at the different locations or that are interlaced together (e.g., randomly, alternating rows, alternating plans, based on some interval, etc.).

For example, for wind abatement the operator may select a plant that has properties that enable wind to be deflected or reduced. Such properties may include, for example, growth heights that are greater than a height threshold (e.g., 3, 4, 5, 10, etc. feet (ft)), resistance to breakage in strong winds (e.g., greater than 10, 15, 20, 25, etc. miles per hour (mph)), foliage that is able to block or deflect wind, plant density that enables wind to be deflected or blocked while permitting the plant to grow while remaining healthy. In another non-limiting example, for unstable soil, the operator may select a plant that can grow rapidly and establish a healthy root system to stabilize unstable soil (e.g., such as on a hill side, et remediation plan c.). To remediate contamination, the operator may identify a plant that can grow in contaminated soil, industrial waste, etc. and/or can remove (e.g., through rhizosphere acidification, etc.) pollutants therefrom for retention in the plant tissue to be treated after harvesting. To remediate agricultural soil to prevent nutrient runoff, the operator may identify a plant that can grow in agricultural soil and/or remove (e.g., through rhizosphere acidification, etc.) nutrients from the soil, groundwater, etc.

As also shown in FIG. 2, process 200 may include planting a selected bio-crop (BLOCK 215) and cultivating the bio-crop (BLOCK 220). For example, bio-crops 160 selected above may be planted (e.g., as seed, seedlings, etc.) at the locations and in the manner identified by the CRBBP plan to begin to reduce the severity of the conditions.

Prior to and/or shortly after planting bio-crop 160, the planting medium (e.g., soil, water, industrial waste, etc.) may be pre-treated based on the baseline characteristics and/or the treatment plan. For example, based on the type of bio-crop 160 that is to be planted and the baseline characteristics, one or more fertilizers, biochar, chemicals, microbes or other substances (e.g., water, etc.) (hereafter, sometimes referred to as "amendments") may be added to the planting medium (e.g., directly via spreading, spraying, irrigation, tilling, etc.). For example, water may be added to or removed from (e.g., through filtering, pumping, etc.) the planting medium to control the thickness, viscosity, density, stability, firmness and/or flowability of the planting medium. The type and quantity of fertilizer amendments may, for example, enable the growth rate of bio-crop 160 to be managed and/or controlled. Additionally, or alternatively, the type and/or quantity of chemical amendments may, for example, enable an acidity level or range (e.g., a pH level or range of pH values) to be managed to control a rate at which bio-crop 160 grows that is suitable for the removal and extraction of a greatest quantity of pollutants or nutrients from the planting medium.

Additionally, or alternatively, bio-crop 160 may be planted based on the baseline characteristics identified in the CRBBP process plan. For example, the baseline characteristics may indicate that the planting medium (e.g., coal ash pond, depleted soil, agricultural soil, water, etc.) is sufficiently firm to enable bio-crop 160 to be directly planted within the planting medium. In this example, each plant, associated with bio-crop 160, may be planted (e.g., by hand or using one or more planting devices known in the art) according to a planting scheme set forth in the treatment plan. The planting scheme may identify the number, orientation, placement, height, width, etc. of planting rows (e.g., based on geographic topology, depth of contamination, type of bio-crop 160, direction of wind, ease and proximity to an irrigation source, etc.), concentration of bio-crop 160 in water applications (e.g., for algae, seaweed, kelp, etc.), as well as the distance between plants, seeds, planting sites, etc.

In one example, when the growth medium has a low viscosity, high liquid content, and/or firmness that cannot support a plant (e.g., the plant would sink into the medium), bio-crop 160 may be planted in a suspended configuration using a type of scaffolding. By way of a non-limiting example, the baseline characteristics of a coal ash pond may indicate that the pond is not firm enough to support the weight of a non-suspended planting scheme due to the risk that the plants would be subject to sinking into or being subsumed by the coal ash. In such a case, a suspension mechanism may be constructed in, on, or above the coal ash pond that enables the roots of each plant to be planted within the coal ash while each plant is supported by the suspension scheme. Such a suspension mechanism may preclude the non-root portions of the plants from sinking into or being subsumed by the coal ash. For example, the suspension mechanism may include scaffolding, netting, mesh, a tarp-like mechanism, suspension wires, suspended fabrics, and/or some other mechanism any of which being suspended above the coal ash, on the surface of the coal ash and/or within the coal ash to which the plants are attached or suspended to preclude sinking or being subsumed by the coal ash.

Once planted, bio-crop 160 may be cultivated to ensure that the plants grow to desired heights, with desired amount of foliage and with the desired amount of pollutant uptake (e.g., from the soil, industrial waste, etc.), and/or that the root systems grow to the desired depth, etc. Once planted, bio-crop 160 may be watered and/or fertilized using methods that are well known in the art. Additionally, or alternatively, all or a portion of bio-crop 160 may be covered by a greenhouse into which heat and/or carbon dioxide are provided to enrich the environment in which bio-crop 160 grows to accelerate growth and/or to extend the growing season during cold weather periods or seasons. In a non-limiting example, bio-product 180, such as biochar and/or bio-fertilizer, may be added as soil amendment to the planting medium.

As further shown in FIG. 2, process 200 may include harvesting a bio-crop (BLOCK 225) and processing the bio-crop to remove pollutants (BLOCK 230). For example, the cultivated bio-crops 160 may be harvested to obtain biomass 170 that, in the case of contamination remediation, includes pollutants extracted from the planting medium (e.g., soil, industrial waste, water, brown field, waste water, etc.). Harvesting may be performed at or near the end of the growing season or some other time. In one example, bio-crop 160 may be harvested prior to the occurrence of plant dormancy when plants senesce by permitting above-ground nutrients, minerals and/or pollutants to be transferred back to the roots or possibly back into the coal ash.

Harvesting may generally include removal of the above-ground portion of the plants (e.g., either by hand or using conventional equipment known in the art for plant harvesting). For bio-crop 160 that include annual plants, the root system may be removed during or after harvesting. For bio-crop 160 that include perennial plants, the root system may be left in the planting medium to permit bio-crop 160 to be used for a subsequent growing season, for example, to remove an additional amount of pollutants from the planting medium.

All or a portion of bio-crop 160 may be harvested depending on the type of remediation, quantity of biomass 170 set forth in the CRBBP process plan, and/or a quantity of bio-product 180 identified in the CRBBP process plan. In a non-limiting example, when bio-crop 160 is being used for wind abatement, a portion of the bio-crop 160 may be harvested based on the CRBBP process plan. Such partial harvesting may, in a non-limiting example, include harvesting alternating rows of plants, alternating plants in a single row, and/or several adjacent rows of plants while leaving enough unharvested plants in place to continue to deflect and/or abate wind. In another non-limiting example, for treatment of industrial waste, the entire bio-crop 160 may be harvested.

The harvested bio-crop 160 may be processed to remove contaminants, nutrients and/or other constituents from the harvested biomass 170. For example, biomass 170 may be processed by cutting, shopping, shredding, agitating, breaking up, etc. to increase the surface area of biomass 170 for further processing. Additionally, or alternatively, biomass 170 may be added to an aqueous solution of chemicals and/or solvents that cause pollutants and/or other constituents to be removed (e.g., through leaching or some other mechanism) from the biomass. Increasing the surface area of biomass 170 may accelerate the reaction with the aqueous solution with biomass 170 and/or enable a greater amount of pollutants to be removed from biomass 170.

The processed biomass 170 may be combined with the aqueous solution to enable a first leachate that includes the pollutants, to be leached from the plants into the aqueous solution and/or as precipitant therein. One or more known filtration, ultrafiltration, micro-filtration, reverse osmosis, and/or centrifuge methods may be used to remove the first leachate from the aqueous solution. The first leachate may be concentrated and/or packaged for proper disposal.

Additionally, or alternatively, a second leachate, that includes the constituents, may be leached from the plants into the aqueous solution and/or as a precipitant therein. The systems and/or methods may enable the second leachate to be removed from the aqueous solution using the one or more known filtration, ultrafiltration, micro-filtration, reverse osmosis, centrifuge methods. The removed second leachate may be sold, packaged and/or shipped to for use in the manufacture of fertilizers or other products such as resins, polymers, etc.

As also shown in FIG. 2, process 200 may include assessing the remediation effectiveness (BLOCK 235). For example, the effectiveness of bio-crop 160 to remove or extract pollutants and/or nutrients from the planting medium may (e.g., soil, industrial waste, water, waste water, grey water, brown fields, etc.) be determined by using known methods of determining concentrations levels of the extracted pollutants and/or nutrients in the harvested biomass 170 or aqueous solution. If the concentration levels of the pollutants and/or nutrients are greater than a pollutant threshold or nutrient threshold, respectively, then the effectiveness of the remediation (e.g., using of bio-crop 160) may be determined, by an operator, to be satisfactory. If, however, the concentration levels of the pollutants and/or nutrients are not greater than the pollutant threshold or nutrient threshold, respectively, then the effectiveness of the remediation may be determined, by the operator, to be unsatisfactory. Additionally, or alternatively, the concentration of pollutants and/or nutrients in the planting medium may be measured and compared to such levels identified in the baseline parameters identified in the CRBBP process plan. The effectiveness of bio-crop 160 to treat the pollutants and/or nutrients may be determined based on an amount in which the concentration levels decreased relative to the baseline concentration levels.

By way of another non-limiting example, in the case of treating industrial waste, such as coal ash, a coal ash pond may be evaluated to identify the amount and concentration of pollutants within the coal ash after bio-crop 160 has been harvested. In the event that the treated coal ash includes pollutants at concentrations that are not less than a contamination threshold, bio-crop 160 may continue to be grown, cultivated, harvested and biomass 170 processed, in a manner similar to that described above, until concentration levels of the pollutants are less than the contamination threshold. In the event that such concentration levels are less than the contamination threshold, the treated coal ash (e.g., from which some or all of the pollutants have been removed) may be left in place in a manner that does not pose a risk to the environment or may be removed from the coal ash pond or treatment site. The treated coal ash that has been removed from the treatment site may be used as ingredients associated with other products such as cement, and/or asphalt, and/or may be packaged, sold, and/or sold for such purposes.

Additionally, or alternatively, the coal ash may be removed from one or more portions of the coal ash pond that include a pollutant concentration level that is below the contamination threshold. For example, the concentration level of a pollutant, within the treated coal ash, may be determined at several locations within the ash pond to identify from which area(s) of the coal ash pond the treated coal ash is suitable to be removed. In this example, coal ash may not be removed from areas, within the ash pond, associated with a pollutant concentration level that is not less than the contamination threshold.

The coal ash may be removed in layers that are commensurate with the depth of the bio-crop 160 plant roots (as described in greater detail below with respect to FIG. 4). For example, if the depth (e.g., mean depth or some other depth) of bio-crop 160 roots is a particular value (e.g., 3, 4, 5, 6, etc. feet), then a layer of treated coal ash may be removed to a depth that is less than or equal to the particular value (e.g., 2, 3, 4, 5, etc. feet).

Additionally, or alternatively, the concentration level of pollutants, within the treated coal ash, may be determined at several different depths within the coal ash pond to determine how the concentration of pollutants changes with respect to depth. In this example, a layer of coal ash may be removed at a depth above which the concentration levels are less than the threshold. When all of the coal ash within the coal ash pond has been treated and/or removed, the coal ash pond may be used for other purposes or may continue to be used as a coal ash pond for new coal ash subject to the treatment afforded by the systems and/or methods herein.

In the event that the effectiveness of bio-crop 160 is unsatisfactory, a different type of bio-crop 160 may be planted (e.g., a different plant know to have a greater uptake of pollutants relative to the original plant type) and/or the type of cultivation (e.g., type, timing or amount of fertilizer, watering, etc. may be provided to bio-crop 160) may be provided to bio-crop 160.

As further shown in FIG. 2, process 200 may include processing biomass to produce bio-products (BLOCK 240) and outputting bio-products (BLOCK 250). For example, biomass 170 may be processed to produce one or more bio-products 180 based on the type of remediation that is desired as specified by the CRBBP process plan and/or market demand at the time of processing. Biomass 170 may be processed using torrefaction process, a bio-fractionation process, a pyrolysis process, and/or some other known process to produce one or more types of bio-products 180, such as biochar, bio-fertilizer, bio-coal, bio-cooking fuel, bio-feedstock, animal bedding, combustible fuel and/or chemicals, etc.

By way of example, biomass 170 may be removed from the aqueous solution and dried (e.g., by pressing, air drying, heating, etc.) to reduce water and/or moisture content of biomass 170 (e.g., usually between 20% and 40% water by weight). The dried biomass 170 may be heated (e.g., through torrefaction, bi-fractionation, pyrolysis, etc.) in the absence of oxygen (e.g., usually between 200 degrees Celsius (C) and 350 degrees C. for torrefaction or, possibly, higher temperatures for pyrolysis or bio-fractionation) to release additional moisture content and/or certain volatiles to create bio-products 180 such as biochar, or bio-coal.

Additionally, or alternatively, the biochar and/or bio-coal may be compressed into pellets, briquettes, or other shapes or volumes to increase the density of the bio-coal. The increase in density of the bio-coal may increase the energy density of the bio-coal (e.g., British Thermal Unit (BTU) per cubic foot ($ft^3$) or $BTU/ft^3$) to enable the compressed bio-coal to be used as an energy source. Additionally, or alternatively, compressing the bio-coal may improve the hydrophobic characteristics of the bio-coal to enable bio-coal to repel water, resist water absorption, or to resist disintegration in the presence of water. Such improved hydrophobic characteristics may enable the bio-coal to be shipped in a manner that is similar to that of regular coal (e.g., without packaging, in train cars, exposed to the elements, etc.) and/or stored in a manner that is similar to coal, such as outdoors in the elements (e.g., rain, snow, ice, sunshine, etc.).

In a non-limiting example, the CRBBP process plan may, for example, indicate that bio-crop 160 was planted to stabilize soil or for soil replenishment that has been depleted of top soil, nutrients, etc. (e.g., due to deforestation, wind erosion, water erosion, etc.) and that biomass 170 is to be used to produce biochar. The biochar and/or bio-fertilizer may be produced, using a torrefaction process, bio-fractionation process, and/or pyrolysis process, and incorporated into the soil to replenish the soil and/or mass-produced for use as a fertilizer.

In another non-limiting example, the CRBBP process plan may indicate that bio-crop 160 was planted for the purpose of wind abatement and/or to treat industrial waste (e.g., such as coal ash, fly ash, etc.), and that biomass 170 produced from bio-crop 160 is to be used to produce bio-coal and/or to provide a low cost clean renewable heating and/or cooking fuel. Additionally, or alternatively, the bio-coal may be mass-produced, fired or burned to produce energy using a conventional combustion process used to burn coal. In one example, the bio-coal can be provided to a conventional fuel pulverizing and feeding system that enables the bio-coal to be provided to a conventional coal-burning furnace used convert water to steam to generate electrical power. Additionally, or alternatively, the bio-coal may be combined with conventional coal and provided to the fuel pulverizing and feeding system to enables the bio-coal and conventional coal to be co-fired to generate electrical power using conventional equipment.

In yet another non-limiting example, the CRBBP process plan may indicate that biomass 170 is to be used to produce combustible fuel and/or chemicals. In this example, biomass 170 may be processed using a bio-fractionation process to produce one or more combustible fuels and/or chemicals, such as bio-ethanol, bio-diesel, bio-methanol, bio-butanol, bio-ethers, etc.

Figure 3A:
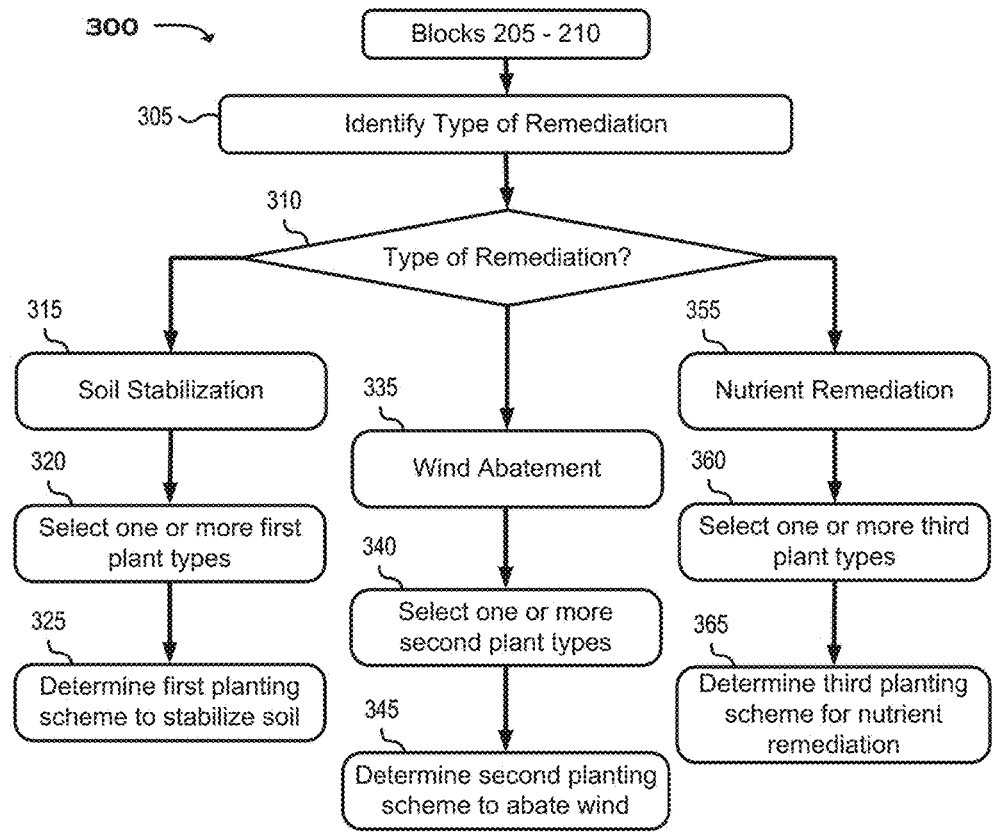
FIGS. 3A and 3B are flow charts of an example process for determining planting and harvesting schemes in connection with a combined remediation biomass and bio-product production operation.
Figure 3B:
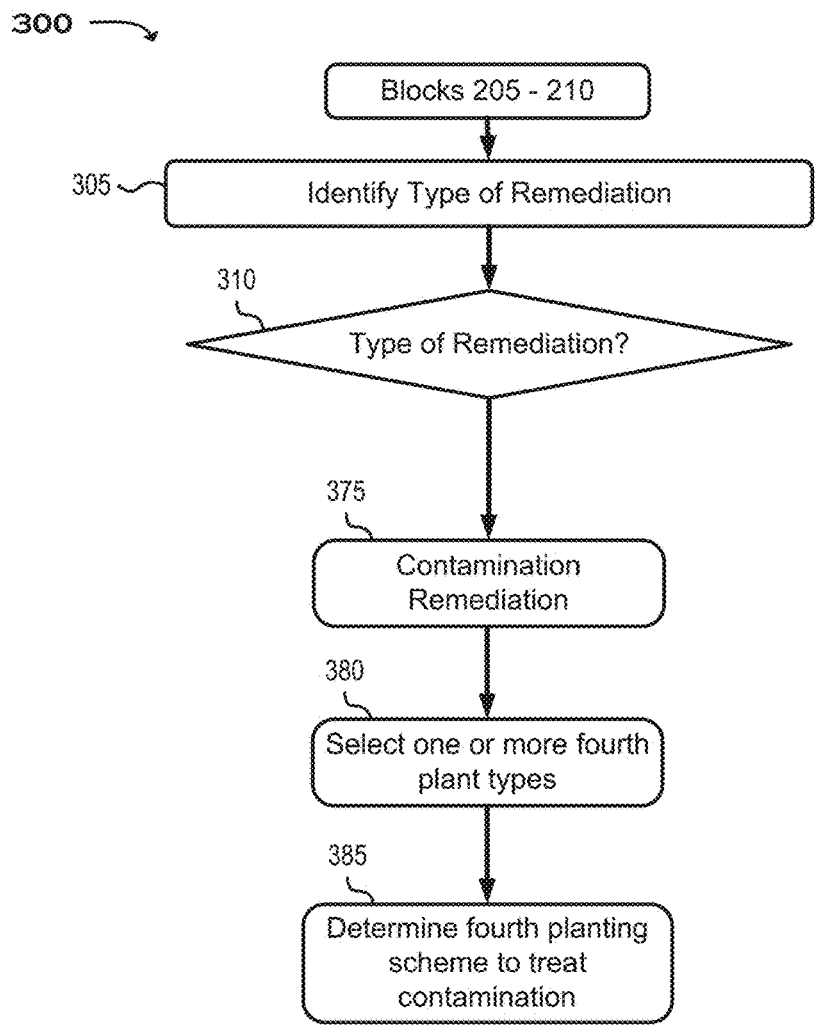

FIGS. 3A and 3B are flow charts of an example process 300 for determining planting and harvesting schemes in connection with a CRBBP operation. Process 300 of FIGS. 3A and 3B is associated with blocks 205 and 210 of process 200 of FIG. 2.

As shown in FIG. 3A, process 300 may include identifying a type of remediation (BLOCK 305) and if the type of desired remediation is soil stabilization (BLOCK 310 & 315), process 300 may include selecting one or more first bio-crops (BLOCK 320) and determining a first planting scheme to stabilize soil (BLOCK 325). For example, in the event that the CRBBP process plan indicates that soil is to be stabilized, a first bio-crop 160 may be selected to stabilize the soil. In this example, first bio-crop 160 may be selected based on a growth rate (e.g., a rate that is greater than a growth threshold) at which root systems, of the first bio-crop 160, develop and take root to stabilize the soil. In this example, first bio-crop 160 may include a first plant species, such as, for example, annual sorghum species or some other first plant species, with a root system that grows at a rate that is greater than the growth threshold. First bio-crop 160 may also, or alternatively, be selected based on a type of biomass 170 and/or bio-product 180 that the CRBBP process plan indicates is to be produced. Additionally, or alternatively, when the roots of the first plant species (e.g., annual sorghum or some other first plant species) takes hold and stabilizes the soil, a different first plant species may be planted with a root system that grows deeper than the root system of the first plant species and/or that does not need to be replanted each year, such as a perennial sorghum, etc.

Additionally, or alternatively, a first planting scheme of first bio-crop 160 may be identified by the CRBBP process plan to enable the soil to be stabilized, such as soil that is on an incline and/or subject to landlsides, water erosion, etc. In this example, first bio-crop 160 may be planted in rows that generally traverse the incline to impede the flow of run-off during precipitation or irrigation.

As also shown in FIG. 3A, if the type of desired remediation is wind abatement (BLOCK 310 & 335), process 300 may include selecting one or more second bio-crops (BLOCK 340) and determining a second planting scheme to abate wind (BLOCK 345). For example, in the event that the CRBBP process plan indicates that wind abatement is desired, a second bio-crop 160 may be selected to deflect or abate wind to protect against the exposure of farmland, dwellings, people, etc. In this example, second bio-crop 160 may be selected based on a height of growth (e.g., a height that is greater than a height threshold sufficient to abate wind), a measure of foliage thickness (e.g., a thickness that is greater than a foliage threshold sufficient to abate wind), and/or a planting density (e.g., a density that is greater than a density threshold sufficient to abate wind) of second bio-crop 160. In this example, second bio-crop 160 may include a second plant species, such as, for example, a perennial sorghum species (e.g., that can reach heights of greater than 10 feet) or some other second plant species that can grow to a height, a foliage thickness, and/or tolerate a plant density that is greater than a height threshold, foliage threshold, and/or density threshold, respectively. Second bio-crop 160 may also, or alternatively, be selected based on a type and/or quantity of biomass 160 and/or bio-product 180 to be produced as specified by the CRBBP process plan.

Additionally, or alternatively, a second planting scheme, of second bio-crop 160, may be identified in the CRBBP process plan to enable second bio-crop 160 to deflect and/or abate the wind. Such a planting scheme may, in a non-limiting example, include one or more rows of second bio-crop 160 that are approximately perpendicular to the prevailing wind or at some other angle that enables the wind to be redirected and/or abated.

As also shown in FIG. 3A, if the type of desired remediation is nutrient remediation (BLOCK 310 & 355), process 300 may include selecting one or more third bio-crops (BLOCK 360) and determining a third planting scheme to remediate nutrients (BLOCK 365). For example, in the event that the CRBBP process plan indicates that nutrition remediation of agricultural and/or grazing soil is desired, a third bio-crop 160 may be selected, as specified by the CRBBP process plan, to extract and/or remove nutrients from the soil. In this example, third bio-crop 160 may be selected based on an ability of a third plant species to extract and/or absorb nutrients from the soil via the roots of third plant species for storage in the plant tissue above ground. Third bio-crop 160 may also, or alternatively, be selected based on a type and/or quantity of biomass 170 and/or bio-product 180 to be produced as specified by the CRBBP process plan.

Additionally, or alternatively, a third planting scheme, of third bio-crop 160, may be specified by the CRBBP process plan to enable third bio-crop 160 to remove and/or extract nutrients from agricultural soil. Such a planting scheme may include plants that are planted based on a plant density that is greater than a density threshold sufficient to remove nutrients from the agricultural soil. Removing nutrients from the soil may enable concentration levels of such nutrients to decrease in nearby waters into which runoff from the soil drains.

As shown in FIG. 3B, if the type of desired remediation is contamination remediation (BLOCK 310 & 375), process 300 may include selecting one or more fourth bio-crops (BLOCK 380) and determining a fourth planting scheme to treat contamination (BLOCK 385). For example, in the event that the CRBBP process plan indicates that contamination remediation of, say, industrial waste (e.g., coal ash, fly ash, mining effluent, etc.) and/or contaminated ground water is desired, a fourth bio-crop 160 may be specified by the CRBBP process plan to enable pollutants to be removed and/or extracted from the industrial waste and/or ground water. In this example, fourth bio-crop 160 may be specified based on an ability of a fourth plant species to extract and/or absorb pollutants from the industrial waste via roots of the fourth plant species for storage in the plant tissue above ground level. In this example, fourth bio-crop 160 may include a fourth plant species, such as, for example, sorghum, miscanthus, sunflower, soy, switch grass, hemp, trees, bushes, algae, seaweed, kelp, etc. with roots that penetrate to a depth that enables the pollutants within the industrial waste and/or at a depth at which the ground water exists to be extracted. Additionally, or alternatively, fourth bio-crop 160 may be planted using a suspended configuration using a type of scaffolding in a manner similar to that described above with respect to FIG. 2. Fourth bio-crop 160 may also, or alternatively, be specified by the CRBBP process plan based on a type and/or quantity of biomass 170 and/or bio-product 180 to be produced.

Additionally, or alternatively, a fourth planting scheme of fourth bio-crop 160 may include rows of fourth bio-crop 160 that planted to cover all or a portion of the industrial waste and/or contaminated ground water.

Figure 4:
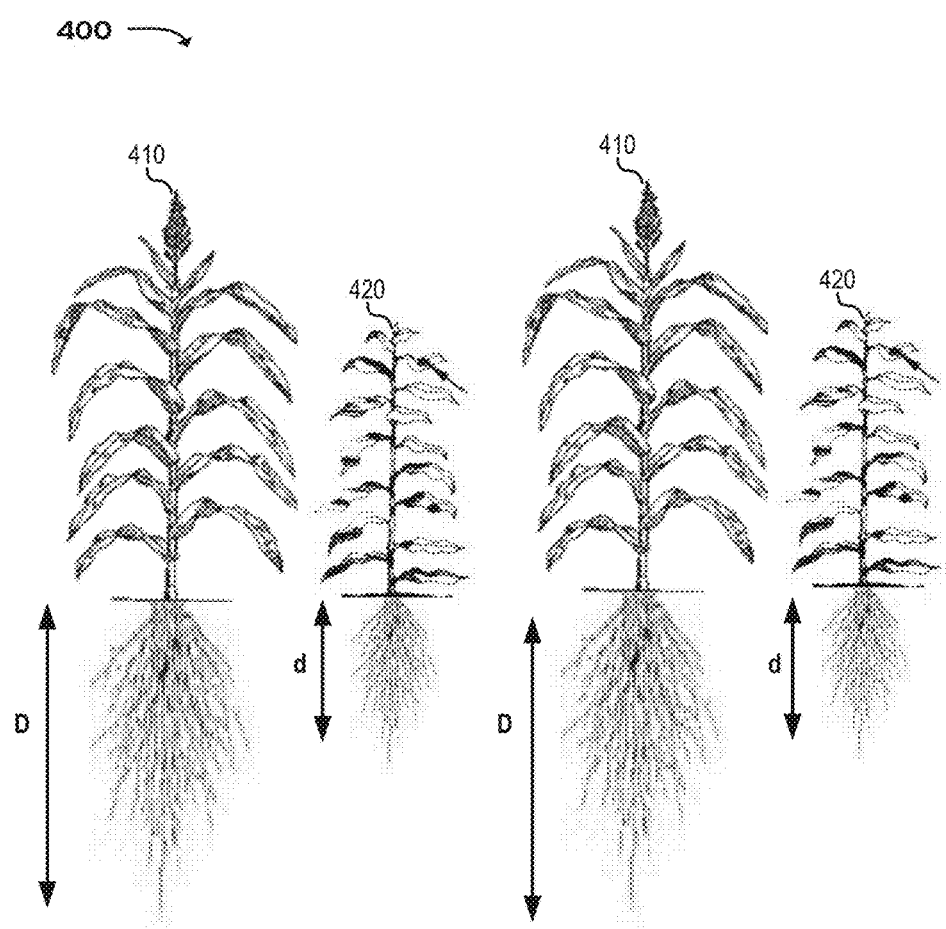
FIG. 4 is a diagram of example plants and/or a planting scheme in connection with a combined remediation biomass and bio-product production operation.

FIG. 4 is a diagram of example plants and/or a planting scheme 400 in connection with a CRBBP operation. As illustrated in FIG. 4, planting scheme 400 may include a first plant 410 and a second plant 420. First plant 410 may correspond to perennial sorghum species and second plant 420 may correspond to an annual sorghum 420 although a planting scheme 400 need not be so limited. Additionally, or alternatively, planting scheme 400 an may include different plants, additional plants, fewer plants, or differently arranged plants than are shown in FIG. 4. Additionally, or alternatively, planting scheme may include a combination of one or more different types of plants such as sorghum, miscanthus, sunflower, soy, switch grass, hemp, trees, bushes, algae, seaweed, kelp, etc.

First plant 410 may include a first root depth (e.g., "D") and second plant 420 may have a second root depth (e.g., "d") that is less than the first root depth. Selection of first plant 410 or second plant 420 may depend on the depth of contamination, a depth of ground water, or a depth of soil to be stabilized and/or replenished within a planting medium. Additionally, or alternatively, planting scheme 400 may include a combination of first plant 410 and second plant 420 in, for example, alternating rows, interlaced within each row, and/or some other planting scheme. Such planting scheme 400 may include different types of first plant 410 and/or second plant 420 to enable one or more different types of biomass 170 and/or bio-products 180 to be produced. For example, first plant 410 may be harvested and processed to produce a first bio-product 180 to be used as a clean, renewable energy source (e.g., bio-coal, bio-cooking fuel, etc.). Second plant 420 may be harvested and processed to produced a second, different bio-product 180 to be used to amend the soil (e.g., biochar, bio-fertilizer, etc.).

Additionally, or alternatively, first plants 410 may be harvested at a different time than second plants 420 to enable wind abatement to be maintained regardless of which of first plant 410 and/or second plant 420 is being harvested.

Figure 5A:
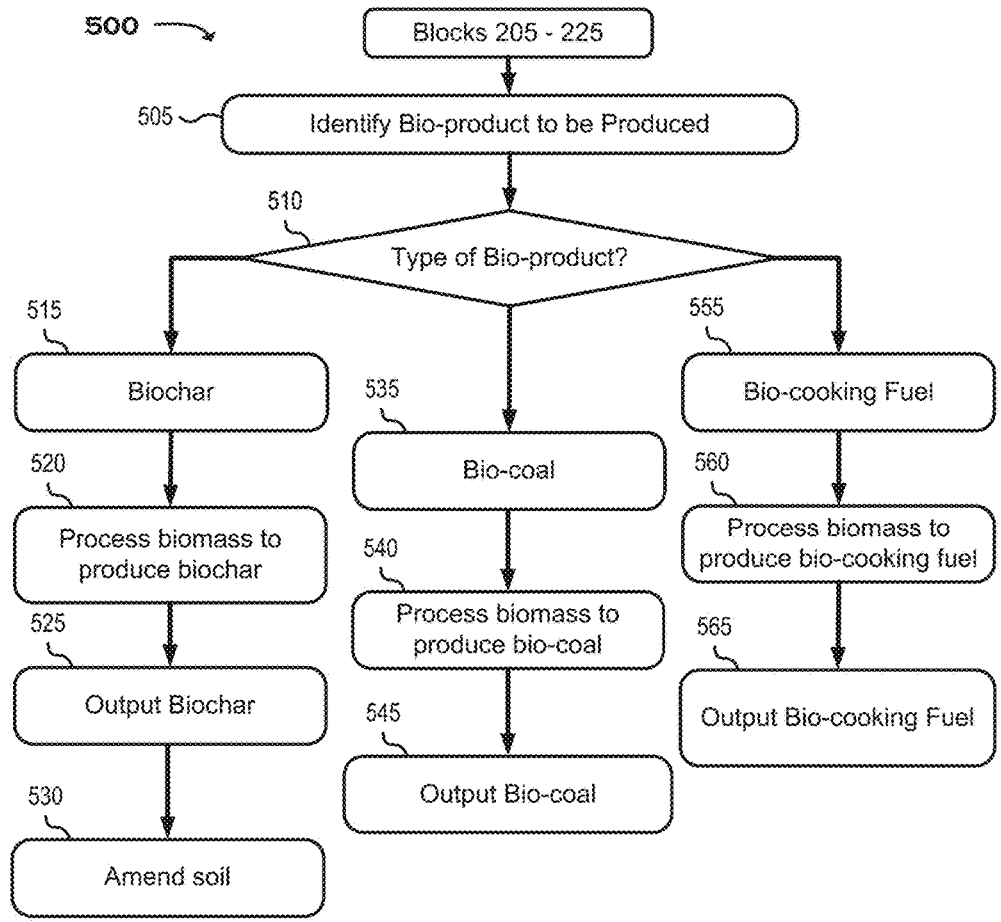
FIGS. 5A and 5B are flow charts of an example process for producing a bio-product in connection with a combined remediation biomass and bio-product production operation.
Figure 5B:
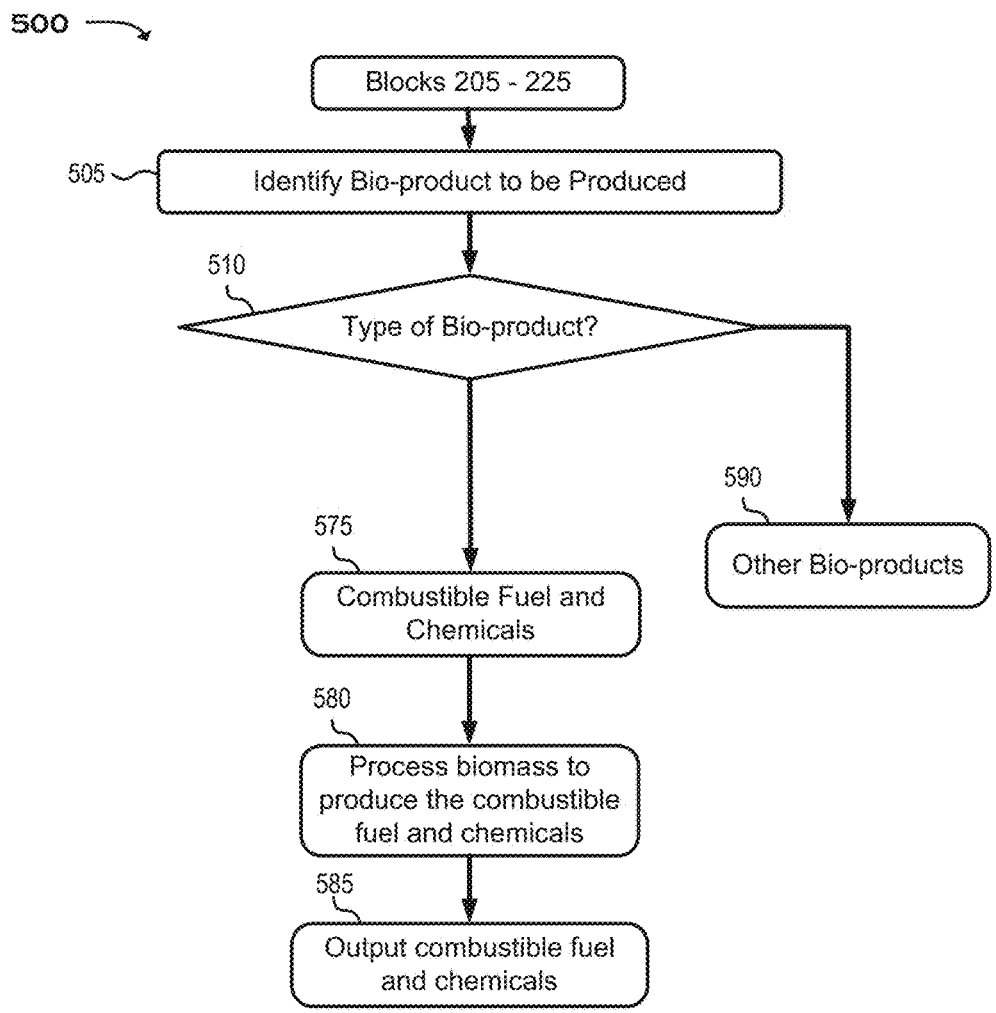

FIGS. 5A and 5B are flow charts of an example process 500 for producing a bio-product in connection with a CRBBP operation. Process 500, of FIGS. 5A and 5B, may correspond to blocks 230, 240 and 245 of process 200 (FIG. 2). As shown in FIG. 5A, process 500 may include identifying a bio-product to be produced (BLOCK 505) and if the type of bio-product corresponds to biochar (BLOCKS 510 and 515), process 500 may include processing biomass to produce the biochar (BLOCK 520). For example, a CRBBP process plan, such as that described above with respect to block 205 of FIG. 2, may specify a type of bio-product 180 to be produced to treat an environmental condition and/or to distribute to a third party (e.g., a power plant, a wholesaler, a retailer, an industrial plant, etc.). Based on a determination that the CRBBP process plan indicates that biochar is to be produced, biomass 170, obtained from a harvested bio-crop 160 in a manner similar to that described above with respect to blocks 225 and 230 (FIG. 2), may be processed to produce the biochar.

In a non-limiting example, biomass 170 may be torrefied to produce the biochar by heating biomass 170 between 200 and 350 degrees Celsius using a combustion process in an inert atmosphere (e.g., with substantially all oxygen removed) to cause moisture content to evaporate leaving biochar. Biochar can be used in feedstock, as a type of fertilizer or soil treatment, as well as other uses such as animal bedding, in water filters, etc.

Additionally, or alternatively, other processes may be used to process the biomass 170 to produce biochar. For example, a high temperature pyrolysis process may be used to process biomass 170 at temperatures in proximity of 600 degrees Celsius in an inert atmosphere to create other forms of biochar and/or bio-fertilizer.

Additionally, or alternatively, biochar may be produced using a biomass fractionation (sometimes referred to as "bio-fractionation") technique by heating biomass 170 under high temperature (e.g., greater than 165 degrees Celsius) and pressure (e.g., pressure greater 100 pounds per square inch (psi)) that separates volatiles, and combustible fuel and chemicals from negative carbon that can be further heated to produce biochar. The combustible fuel and chemicals (described below) (e.g., bio-ethanol, bio-butanol, bio-methanol, bio-diesel, etc.) can be recovered and used as a liquid bio-fuel and/or chemicals in manufacturing of plastics, resins, pulps for paper, fibers, etc.

As also shown in FIG. 5A, process 500 may including outputting the biochar (BLOCK 525) and amending the soil using the biochar (BLOCK 530). For example, the biochar may be output from the torrefaction process, high temperature pyrolysis, bio-fractionation, and/or other processes and introduced to amend nutrient-depleted soil, identified in the CRBBP process plan to re-build a fertile layer of top soil suitable for growing crops. Additionally, or alternatively, the biochar may be introduced to amend feedstock as a source of nutrients for livestock. Additionally, or alternatively, the biochar may be packaged and shipped to distributors, power plants, wholesalers, retailers, industrial plants, etc. for sale on the market.

As further shown in FIG. 5A, if the type of bio-product corresponds to bio-coal (BLOCKS 510 and 535), process 500 may include processing biomass to produce the bio-coal (BLOCK 540) and outputting the bio-coal (BLOCK 545). For example, the CRBBP process plan may specify that a type of bio-product 180 to be produced corresponds to bio-coal. In a non-limiting example, biomass 170 may be torrefied to produce the bio-coal by heating biomass 170 between 200 and 350 degrees Celsius using a combustion process in an inert atmosphere (e.g., with substantially all oxygen removed) to cause moisture content to evaporate and/or otherwise be removed. The torrefied biomass may also, or alternatively, by further compressed and hardened to increase energy density (e.g., BTU/pound, etc.) usually in the form of pellets, briquettes, etc. to create a hard, water resistant, substance known as bio-coal. Bio-coal has good, clean burning properties relative to other forms of solid fuel such as coal.

Additionally, or alternatively, bio-coal may be produced using biomass fractionation by heating biomass 170 under high temperature (e.g., greater than 165 degrees Celsius) and pressure (e.g., greater than 100 psi) to separate volatiles, and combustible fuel and chemicals from negative carbon that can be compressed into pellets, briquettes, etc. and used as bio-coal. The combustible fuel and chemicals (described below) (e.g., bio-ethanol, bio-butanol, bio-methanol, bio-diesel, etc.) can be recovered and used as a liquid bio-fuel and/or chemicals in manufacturing of plastics, resins, pulps for paper, fibers, etc. Other processes, such as high temperature pyrolysis (e.g., such as that described above) and/or other processes may be used to produce bio-coal.

The bio-coal may be used as a low cost renewable energy source that can be burned alone or mixed with coal to enable a cleaner burning alternative to coal. Bio-coal can be packaged, shipped, and/or sold on the open market. In a non-limiting example, bio-coal may be introduced into a community as a replacement for burning wood as a source of heat or used for cooking.

As also shown in FIG. 5A, if the type of bio-product corresponds to bio-cooking fuel (BLOCKS 510 and 555), process 500 may include processing biomass to produce the bio-cooking fuel (BLOCK 560) and outputting the bio-cooking fuel (BLOCK 565). For example, based on a determination that the CRBBP process plan indicates that bio-cooking fuel is to be produced, biomass 170, obtained from a harvested bio-crop 160 such as that described above with respect to blocks 225 and 230 (FIG. 2), may be processed to produce the bio-cooking fuel.

In a non-limiting example, biomass 170 may be torrefied in a manner similar to that described above with respect to biochar to produce the bio-cooking fuel that can used as a low cost, clean-burning alternative to burning firewood to cook food, sterilize water, and/or as a source of heat.

Additionally, or alternatively, bio-cooking fuel may be produced using a biomass fractionation technique similar to that described above with respect to bio-coal production. The biomass fractionation may separate volatiles, and combustible fuel and chemicals from negative carbon that can be used to produce bio-cooking fuel. Combustible fuels and chemicals (described below) (e.g., bio-ethanol, bio-butanol, bio-methanol, bio-diesel, etc.) can be recovered and used a liquid bio-fuel and/or chemicals in manufacturing of plastics, resins, pulps for paper, fibers, etc.

The bio-cooking fuel may be output from the torrefaction, biomass fractionation, and/or high-temperature pyrolysis process and distributed for use as a clean, renewable and low-cost alternative to burning wood for cooking or heating. Such bio-cooking fuel may also, or alternatively be distributed to wholesalers, retailers, etc. to be offered for sale in the market.

As shown in FIG. 5B, if the type of bio-product corresponds to combustible fuel and chemicals (BLOCKS 510 and 575), process 500 may include processing biomass to produce the combustible fuel and chemicals (BLOCK 580) and outputting the combustible fuel and chemicals (BLOCK 585). For example, the CRBBP process plan may specify that a type of bio-product 180 to be produced corresponds to combustible fuel and/or chemicals, such as, for example, bio-ethanol, bio-butanol, bio-methanol, bio-diesel, etc. In a non-limiting example, biomass 170 may be processed using a biomass fractionation process by heating biomass 170 under high temperature (e.g., 160-260 degrees Celsius) and pressure (e.g., approximately 100 psi-725 psi) followed by a rapid release of pressure to that separates volatiles, and combustible fuel and chemicals from negative carbon that can used as biochar, bio-fertilizer, bio-coal, etc. The combustible fuel and chemicals can be recovered and used a liquid combustible fuel and/or chemicals in manufacturing of plastics, resins, pulps for paper, fibers, etc.

The combustible fuels and/or chemicals may be output from the biomass fractionalization process as low cost renewable energy source and/or a source of industrial supply for sale on the market.

As also shown in FIG. 5B, if the type of bio-product corresponds to other bio-products (BLOCKS 510 and 590), process 500 may include processing biomass to produce the other bio-products (BLOCK 580). For example, the CRBBP process plan may specify that a type of bio-product 180 to be produced corresponds to other bio-products 180, such as, for example, carbon black, carbon powder (e.g., using torrefaction, bio-fractionation, pyrolysis, etc.), bio-gas (e.g., by anaerobic digestion of biomass 170), pulp and paper (e.g., using known processes to break down biomass 170), bio-fibers, bacterial bioplastics (e.g., by bio-chemical processing of biomass 170), bio-rubber, bio-foam, etc. The other bio-products may be distributed and/or sold on the open market.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 2, 3A and 3B, and 5A and 5B, the order and/or timing of the blocks is not intended to be limiting and may be modified in other implementations. Further, non-dependent blocks may be performed in parallel, concurrently, substantially concurrently, and/or in a different order. Additionally, or alternatively, in other implementations, the processes described with regard to FIGS. 2, 3A and 3B, and 5A and 5B, may include additional elements, less elements, modified elements, and/or different elements than shown in FIGS. 2, 3A and 3B, and 5A and 5B.

It will be apparent that systems and methods, as described above, may be implemented in many different forms of hardware in the implementations illustrated in the figures. The actual hardware used to implement these systems and methods is not limiting of the implementations. Thus, the operation and behavior of the systems and methods were described without reference to the specific hardware—it being understood that hardware can be designed to implement the systems and methods based on the description herein.

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for mitigating an environmental condition, the method comprising:
    assessing a geographic area with which the the environmental condition is associated;
    creating, based on the assessment, a plan to mitigate the environmental condition, the plan identifying a bio-crop for mitigating the environmental condition and a bio-product to be produced from the bio-crop;
    planting, based on creating the plan, the bio-crop in soil that is located within the geographical area, the bio-crop being planted in a manner that enables the bio-crop to mitigate the environmental condition;
    harvesting the bio-crop based on planting the bio-crop;
    processing the harvested bio-crop to obtain biomass;
    processing the biomass to create the bio-product, the bio-product corresponding to at least one of biochar, bio-coal, bio-fertilizer, bio-ether, animal bedding, carbon black, carbon powder, pulp, paper, bio-fiber, bio-plastic, bio-rubber, or bio-foam; and
    outputting the bio-product based on processing the biomass.

2. The method of claim 1, further comprising:
    identifying, based on the plan, a type of bio-product to be produced from the bio-crop,
    processing the biomass in a manner that enables the type of bio-product to be produced, and
    outputting the type of bio-product.

3. A method for mitigating an environmental condition, the method comprising:
    assessing a geographic area with which the the environmental condition is associated;
    creating, based on the assessment, a plan to mitigate the environmental condition, the plan identifying a bio-crop for mitigating the environmental condition and a bio-product to be produced from the bio-crop;
    planting, based on creating the plan, the bio-crop in soil that is located within the geographical area, the bio-crop being planted in a manner that enables the bio-crop to mitigate the environmental condition;
    harvesting the bio-crop based on planting the bio-crop;
    processing the harvested bio-crop to obtain biomass;
    processing the biomass to create the bio-product; and
    outputting the bio-product based on processing the biomass;
    wherein the environmental condition corresponds to at least one of deforested soil, contaminated ground water that includes one or more pollutants, industrial waste that includes the one or more pollutants, exposure to wind due to the deforested soil, depleted soil that cannot sustain agriculture, or agricultural soil that includes nutrients that are polluting the environment.

4. The method of claim 1, further comprising:
    determining, based on the assessment, that the environmental condition corresponds to at least one of:
        deforestation,
        depleted soil that has lost top soil or nutrients,
        eroded soil,
        unstable soil, or
        agricultural soil with nutrients that are contaminating water; and
    planting the bio-crop in at least one of:
        soil exposed due to the deforestation,
        the depleted soil,
        the eroded soil,
        the unstable soil, or
        the agricultural soil.

5. The method of claim 4, further comprising:
processing the biomass in a manner that enables a type of bio-product to be produced that corresponds to biochar or bio-fertilizer; and
apply the biochar or the bio-fertilizer to the at least one of:
soil associated with the deforestation,
the depleted soil,
the eroded soil,
the unstable soil, or
the agricultural soil
to mitigate the environmental condition.

6. The method of claim 1 or claim 3, where processing the biomass further includes:
chopping the harvested bio-crop to increase surface area of the harvested bio-crop;
soaking the chopped bio-crop in an aqueous solution to remove pollutants from the chopped bio-crop;
removing the chopped bio-crop from the aqueous solution;
drying the chopped bio-crop that has been removed from the aqueous solution; and
performing a torrefaction process on the chopped bio-crop, based on drying the bio-crop, to produce the bio-product.

7. The method of claim 1, further comprising:
determining, based on the assessment, that the environmental condition corresponds to a lack of renewable and clean energy; and
processing the biomass in a manner that uses:
a torrefaction process to produce a first type of the bio-product that corresponds to bio-coal, or
a bio-fractionation process to produce a second type of bio-product that corresponds to a combustible fuel or chemical.

8. The method of claim 1 or claim 3, further comprising:
processing the biomass in a manner that enables a type of bio-product to be produced that mitigates the environmental condition; and
applying the type of bio-product to the environmental condition to mitigate the environmental condition.

9. The method of claim 3, where the bio-product includes at least one of:
biochar,
bio-coal,
bio-fertilizer,
bio-cooking fuel,
biodiesel,
bio-ethanol,
bio-butanol
bio-methanol,
bio-ether,
bio-feedstock, or
animal bedding.

10. A method for mitigating environmental conditions and for producing a bio-product, the method comprising:
assessing a geographic area associated with a first condition of the environmental conditions and a second condition of the environmental conditions,
the first condition corresponding to contamination, and
the second condition corresponding to a lack of a clean energy source;
creating, based on the assessment, a plan to mitigate the first condition and the second condition, the plan identifying a bio-crop to be used to mitigate the first environmental condition and the bio-product for mitigating the first condition or the second condition;
planting the bio-crop in soil associated with the contamination;
cultivating the planted bio-crop to enable a pollutant, within the soil, to be removed or extracted by roots of the bio-crop, removing the pollutant enabling the first environmental condition to be mitigated;
harvesting the bio-crop based on cultivating the bio-crop;
processing the harvested bio-crop to remove the pollutant from the harvested bio-crop and to obtain biomass;
processing the biomass in a manner that produces the bio-product that corresponds to bio-coal; and
outputting the bio-product to mitigate the second environmental condition.

11. The method of claim 10, where processing the harvested bin-crop further includes:
performing a phytoremediation process on the harvested bio-crop to remove the pollutant from the harvested bio-crop.

12. The method of claim 10, where processing the biomass further includes:
performing at least one of:
a torrefaction process on the biomass to produce the bio-product
a biomass fractionation process on the biomass to produce the bio-product; or
a pyrolysis process on the biomass to produce the bio-product.

13. The method of claim 10 further comprising:
harvesting another bin-crop;
processing the other bio-crop to remove the pollutant from the other bio-crop and to create other biomass; and
processing the other biomass in a manner that creates another bio-product, the other bio-product corresponding to biochar; and
applying the other bio-product to a third environmental condition that corresponds to soil that has been depleted of nutrients,
the other bio-product being applied to the third environmental condition causing the first environmental condition to be mitigated.

14. The method of claim 13, where applying the other bio-product to the third environmental condition further includes:
amending the soil with the other bio-product.

15. A method for mitigating one or more environmental conditions and for producing one or more bio-products, the method comprising:
assessing a geographic area associated with the one or more environmental conditions;
creating, based on the assessment, a plan to mitigate the one or more environmental conditions, the plan identifying a bio-crop to be used to mitigate the one or more environmental conditions and the one or more bio-products to be produced from the bio-crop;
planting a plurality of plants, associated with the bio-crop, in soil that is located within the geographical area, the plurality of the plants being planted in a manner that enables the bio-crop to mitigate at least one condition of the one or more environmental conditions;
harvesting the bio-crop based on planting the bio-crop;
processing the harvested bio-crop to obtain biomass;
processing the biomass to produce one or more bio-products; and
applying at least one bio-product, of the one or more bio-products, to the soil to:

mitigate further the at least one condition, or
mitigate a second condition, of the one or more environmental conditions.

16. The method of claim 15, where the bio-crop is based on at least one of:
sorghum,
miscanthus,
maize,
sunflower,
soy,
switch grass,
hemp,
trees,
bushes,
algae,
seaweed, or
kelp.

* * * * *